3,041,370
PREPARATION OF p,p'-ISOPROPYLIDENEDI-
PHENOL DISALICYLATE
Fred Bryner and Andrew J. Dietzler, Midland, Mich., assignors to The Dow Chemical Company, Midland, Mich., a corporation of Delaware
No Drawing. Filed July 3, 1959, Ser. No. 824,770
7 Claims. (Cl. 260—474)

This invention is concerned with an improved process for the synthesis of p,p'-isopropylidenediphenol disalicylate.

A known procedure for the preparation of p,p'-isopropylidenediphenol disalicylate includes the reaction of salicylic acid with p,p'-isopropylidenediphenol in the presence of $POCl_3$ under esterifying conditions. This procedure results in very low yields.

The present invention is based on the discovery that salicyloyl chloride can be reacted with p,p'-isopropylidenediphenol using an amine catalyst to form p,p'-isopropylidenediphenol disalicylate in high yields. It has further been found that preparing the salicyloyl chloride by the reaction of thionyl chloride with salicylic acid in an inert organic solvent and in the presence of aluminum chloride, then adding the p,p'-diisopropylidenediphenol and a catalytic amount of an organic amine to the solution and reacting the diphenol with the salicyloyl chloride in the reaction mixture in which the salicyloyl chloride was prepared results in the formation of p,p'-isopropylidenediphenol disalicylate in high yields.

The process of the present invention includes contacting approximately equimolar amounts of salicylic acid and thionyl chloride in an inert organic solvent and in the presence of anhydrous aluminum chloride at a temperature of about 40° to about 60° C., until the evolution of sulfur dioxide and hydrogen chloride ceases, removing the dissolved sulfur dioxide and hydrochloric acid by blowing with an inert gas, such as, for example, nitrogen, adding p,p'-isopropylidenediphenol and a catalytic amount of an organic amine, e.g. from 0.01 to 5.0 percent by weight of the diphenol, to the mixture, heating at a temperature of from about 40° to 60° C. until the evolution of hydrogen chloride ceases, and, separating the p,p'-isopropylidenediphenol disalicylate.

Any organic amine such as, for example, quinoline, pyridine, triethylamine, methylamine, octyl amine, aniline, N-methyl aniline, N,N-dimethyl aniline, toluidine, dodecyl amine and the like, or a hydrohalide, sulfate or nitrate salt thereof may be used as a catalyst. The reaction temperature is maintained between about 40° C. and about 60° C. At higher temperatures the salicyloyl chloride decomposes quite rapidly, and at lower temperatures the reaction proceeds very slowly. Preferably, the temperature is maintained between about 45° and about 50° C. Atmospheric pressure is generally employed, although higher or lower pressures may be used.

Any solvent which is inert to the materials in the reaction mixture and which is a moderately good solvent for both the starting diphenol and the disalicylate product can be used, such as, for example, carbon tetrachloride, ethylene dichloride, propylidene dichloride, perchloroethylene, chlorobenzene, and the like.

An amount of solvent sufficient to render the mixture easily stirrable is generally employed. Separation of the p,p'-isopropylidenediphenol disalicylate is readily accomplished by cooling the reaction mixture to crystallize the product and separating the precipitated product in usual ways, e.g. by filtration, wheeling, or the like.

The process of the present invention may be further illustrated, but is not to be construed as limited, by the following examples:

*Example I*

A charge of 12.1 pounds (0.0878 mole) of salicylic acid, 3 gallons of carbon tetrachloride, 10.63 pounds (0.0878 mole) of 97.5 percent thionyl chloride, and 11 grams of anhydrous aluminum chloride was placed in a ten gallon glass-lined kettle and stirred while being heated to temperatures of 45 to 50° C. Stirring and heating were continued for 6.5 hours after which the reaction mixture was blown with dry nitrogen for 1.5 hours to remove dissolved sulfur dioxide and hydrogen chloride. The mixture was cooled to about 30° C. and 9.53 pounds (0.0417 mole) of p,p'-isopropylidenediphenol and 54.5 grams of quinoline as catalyst were added. The resulting mixture was heated and stirred and maintained at a temperature of 45° to 50° C. for 13 hours, at which time the evolution of hydrogen chloride had ceased. Two gallons of carbon tetrachloride were added. The mixture was blown with nitrogen for 1.5 hours while the temperature was maintained at 45° to 50° C. After cooling to 22° C. the mixture was a slurry of crystals and liquid which was wheeled and the crystals were washed on the wheel with 5.25 pounds of carbon tetrachloride. The crystals were dried in a forced air oven at 65° C. for sixteen hours. Fifteen pounds of p,p'-isopropylidenediphenol disalicylate product having a melting point of 154.6° to 157° C. were obtained. This represents a yield of 77 percent based on p,p'-isopropylidenediphenol starting material.

*Example II*

This experiment was identical to Example I except that at the end of the second step 33 pounds of wheel liquor from the previous run were added instead of 2 gallons of carbon tetrachloride. From this run 18.8 pounds of p,p'-isopropylidenediphenol disalicylate product having a melting point of 154–156.5° C. were obtained. This represents a yield of 96.5 percent based on the p,p'-isopropylidenediphenol.

*Example III*

A mixture of 75.5 grams (0.525 mole) of salicylic acid, 150 milliliters of carbon tetrachloride, 63.7 grams (0.536 mole) of thionyl chloride and 0.15 gram of anhydrous aluminum chloride was placed in a 500 milliliter glass reactor and heated at 45 to 50° C. for 6 hours while stirring. The HCl and $SO_2$ formed in the reaction were vented into a scrubber. After the 6 hour heating period the reaction mixture was blown with dry nitrogen for 20 minutes to remove most of the HCl and $SO_2$. At this point a mixture of 57.1 grams (0.25 mole) of p,p'-isopropylidenediphenol and 0.7 gram (0.0054 mole) of quinoline was added and the mixture heated at 45 to 50° C. for 17 hours while stirring. After addition of 100 milliliters of carbon tetrachloride the mixture was blown with nitrogen for 20 minutes and then cooled to 20° C. and filtered. The crystals were washed with 15 milliliters of carbon tetrachloride and then dried at 50° C. overnight. The yield of p,p'-isopropylidenediphenol disalicylate was 93 grams (79.4 percent based on diphenol) having a melting point of 154–157° C.

In a manner similar to that of Example III other runs were made using different amines as catalysts. The results are summarized in the following table wherein run 6 indicates the lower yield and poorer product obtained when no catalyst is used:

| Run | Moles Salicylic Acid | Moles SOCl₂ | Moles Bisphenol A | Amine | Moles Amine | Percent Yield | M.P., °C. |
|---|---|---|---|---|---|---|---|
| 1 | 0.525 | 0.536 | 0.25 | Pyridine | 0.0054 | 75.8 | 155.5–158.0 |
| 2 | do | do | do | Triethylamine | do | 82.0 | 155.0–157.5 |
| 3 | do | do | do | Aniline | do | 66.6 | 146.0–151.0 |
| 4 | do | do | do | Octylamine | do | 70.0 | 153.0–156.0 |
| 5 | do | do | do | N-Methyl Aniline | do | 68.2 | 138.0–146.0 |
| 6 | do | do | do | None | | 56.0 | 109.0–129.0 |

Various modifications may be made in the present invention without departing from the spirit or scope thereof, and it is understood that we limit ourselves only as defined in the appended claims.

We claim:

1. In the process for preparing p,p'-isopropylidenediphenol disalicylate from reaction mixtures consisting essentially of salicyloyl chloride and p,p'-isopropylidenediphenol, the improvement which consists of reacting salicyloyl chloride with p,p'-isopropylidenediphenol in an inert solvent and in the presence of a catalytic amount of a tertiary amine and at a temperature from about 40° to about 60° C.

2. The process of claim 1 wherein the temperature is 45° to 50° C.

3. The process of claim 1 wherein the inert solvent is carbon tetrachloride.

4. The process of claim 1 wherein the amine catalyst is quinoline.

5. The process of claim 1 wherein the amine catalyst is pyridine.

6. The process of claim 1 wherein the amine catalyst is triethylamine.

7. The process of claim 1 wherein stoichiometric proportions of organic reactants are employed.

References Cited in the file of this patent

UNITED STATES PATENTS

| 2,007,013 | Dvornikoff | July 2, 1935 |
| 2,686,199 | Bentz | Aug. 10, 1954 |
| 2,899,458 | Wilson | Aug. 11, 1959 |

OTHER REFERENCES

Groggins: "Unit Processes in Organic Synthesis," pages 640–1, McGraw-Hill, 1947.

Hickinbottom: "Reactions of Organic Compounds," pages 98–9, Longmans, 1948.